Figure 1:
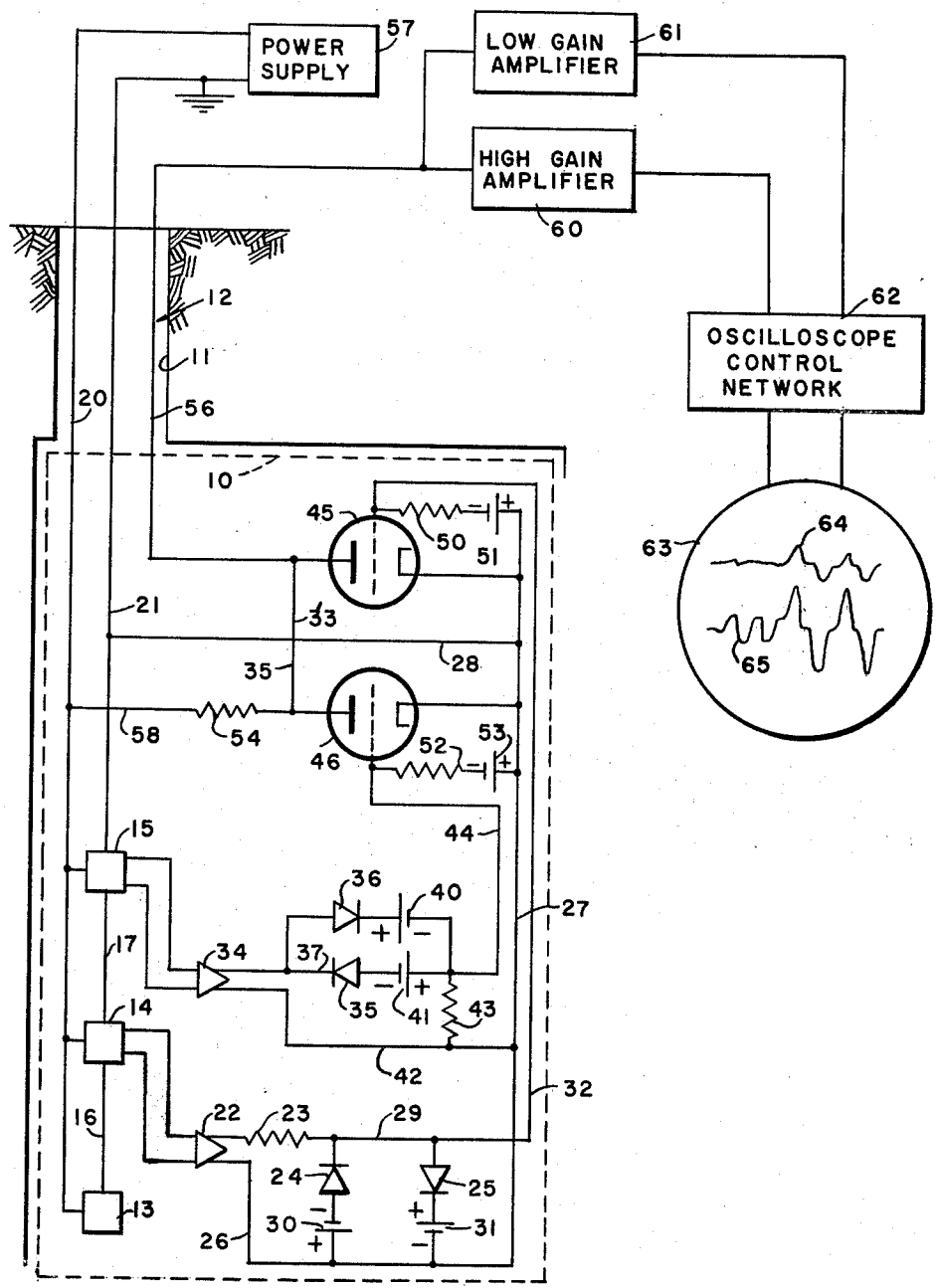

INVENTOR:
CHARLES B. VOGEL
BY: Theodore E. Bieber
HIS ATTORNEY

3,182,744
WELL LOGGING
Charles B. Vogel, Houston, Tex., assignor to Shell Oil Company, New York, N.Y., a corporation of Delaware
Filed Feb. 10, 1960, Ser. No. 7,930
6 Claims. (Cl. 181—.5)

This invention pertains to acoustical well logging and more particularly to a means for maintaining the signals from two receivers in an acoustical well logging device separated when the signals are transmitted over a single electrical circuit to the surface.

In most acoustical well logging instruments the downhole apparatus consists of a sound source and two spaced receivers which are placed to one side of the sound source, thus the acoustical impulse generated by the source will travel past the two receivers in succession. The receivers receive the acoustical impulse and convert it into an electrical signal which may be transmitted to the surface. The beginning of the electrical signal for each receiver indicates the time at which the acoustical impulse arrived at the receiver. From this information one can determine the velocity of the sound through the formation surrounding the borehole and from the velocity the characteristic of the formation. In order to limit the number of conductors required in the cable connecting the downhole instruments to the surface recording instruments the electrical signals from both receivers are preferably transmitted over a single conductor or circuit. In general, and if steps are not taken to maintain a definite separation between the two signals from the receivers they tend to intermingle making it difficult to ascertain exactly when the sound impulse arrived at the second or far receiver.

In the past, it has been suggested to use a switching arrangement in which the first receiver is silenced after the acoustical impulse has passed it and before the acoustical impulse arrived at the second receiver. Such a system is disclosed in my copending application, Serial No. 493,999, filed March 14, 1955 and entitled "Well Logging."

While this system is satisfactory it does require downhole electronic devices to perform the switching apparatus. The required downhole electronic apparatus is subject to failure and complicates the construction of the downhole logging tool.

The above application also discloses a second means for maintaining the two receiver signals separated which depends upon the attenuation of the signals of the two receivers in order to separate them. In the attenuation method one receiver signal is provided with an amplitude materially greater than the amplitude of the other signal which usually results in records that are easy to interpret even though the signals from the two receivers intermingle during transmission. While the method for attenuating signals disclosed in my copending application is satisfactory for use in some formations, it is unsatisfactory for use in limestone formations unless a very short interval is used between receivers. In a limestone formation the first sound waves to arrive at the receiver have a relatively low amplitude but the later arriving shear waves have a much larger amplitude. The later arriving shear waves thus sometimes arrive at the first receiver about the same time that the first waves arrive at the second receiver and tend to obscure the second receiver signals even though they are greatly amplified.

Accordingly, it is the principal object of this invention to provide a novel acoustical well logging system in which the signal from the near receiver is transmitted at a constant amplitude and the signal from the second or far receiver is greatly amplified in order that both signals may be transmitted over a single circuit means without the first or near receiver signal masking out or obscuring the signal from the second receiver.

A further object of this invention is to provide a novel construction for an acoustical well logging instrument utilizing two spaced receivers and amplitude adjustment of the signals to prevent their intermingling while preserving the shape of the individual signals.

The above objects and advantages are achieved by providing a downhole instrument having a single transmitter and two spaced receivers with a means for adjusting the amplitude of the first receiver signal to a constant level regardless of its actual amplitude. More particularly a clipping circuit is used to limit the first or near receiver signal to a constant low amplitude even though its actual amplitude may vary over a wide range. The signal from the second or far receiver is amplified to a higher level than the first receiver signal and for this reason has a higher noise level; this noise level is reduced by passing the signal through a slicer as explained below. Both receiver signals are then combined and the combined signal transmitted over a single electrical circuit to the surface recording equipment. At the surface the signals may be separated by passing the combined signal through a low gain amplifier and a high gain amplifier and then utilizing the output signals of the two amplifiers to control individual beams on a twin beam oscilloscope or the like. By this method the signal from the first receiver will be practically eliminated in the output signal from the low gain amplifier due to its low constant amplitude while it will clearly appear in the signal from the high gain amplifier. Thus, by following the two traces which appear on the oscilloscope one has an accurate record of the two receiver signals. Likewise, the two amplifier signals can be used to control other recording equipment such as that disclosed in my copending application Serial No. 836,303, filed August 26, 1959 and entitled "Velocity Well Logging."

Figure 2:
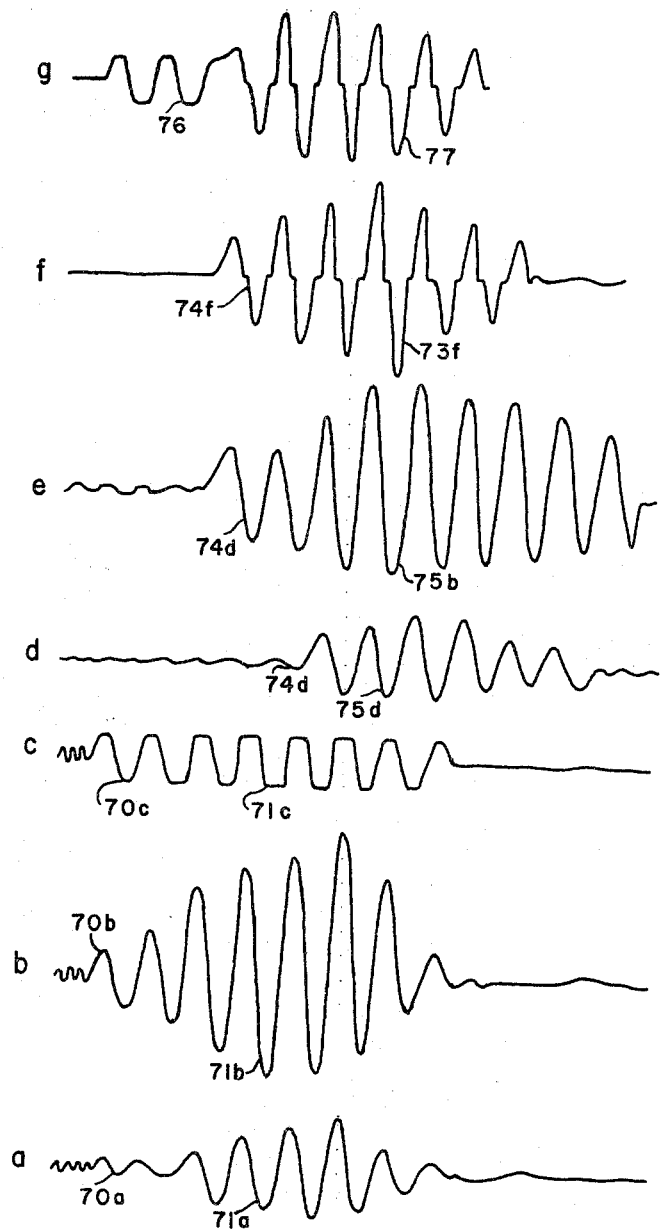

These objects and advantages will be more easily understood from the following detailed description of a preferred embodiment when taken in conjunction with the attached drawing in which:

FIGURE 1 is a drawing partly in schematic form of a cross section of the earth with a well logging device constructed according to this invention disposed therein; and FIGURE 2 is a series of curves showing the shape of the signals which occur in various points in the logging system of FIGURE 1.

Referring now to FIGURE 1 there is shown an acoustical logging system in which the downhole or subsurface apparatus is enclosed within a pressuretight housing which is diagrammatically illustrated by the dotted line 10. The subsurface apparatus is connected to the end of the logging cable 12 in order to lower the apparatus into the wellbore 11 to perform the logging operation and provide the necessary circuits between the downhole and surface equipment. The logging cable 12 of course must have sufficient mechanical strength to support the subsurface apparatus and in addition provide sufficient conductors for the necessary circuits between the subsurface tool and the surface recording system. The subsurface tool consists of a transmitter 13 and two receivers 14 and 15 spaced vertically above the transmitter. The transmitter and receivers are of known construction and should be capable of generating and transmitting acoustical impulses and receiving the transmitted impulses and converting them to fluctuating electrical signals. The receivers and transmitter are coupled together by means of connecting links 16 and 17 which should be capable of maintaining a fixed spacing between units while at the same time providing sufficient flexibility to permit the subsurface tool to pass through the irregularities of the wellbore 11. The transmitter and receiver are supplied with power over one circuit 20 contained within the cable 12 while the ground return is provided by an additional circuit 21. The two circuits 20 and 21 are connected to a power supply 57 located at the surface.

The electrical signal from the receiver 14 which is related to the acoustical impulse received by the receiver passes through an amplifier 22. The amplifier 22 should have a relatively low gain and is used primarily to insure that the signal from the receiver 14 exceeds the level at which the clipping circuit to be described below is set. The signal from the amplifier is coupled to a clipping circuit through a load resistance 23. The clipping circuit consists of two diodes 24 and 25 which are disposed between a ground lead 26 and a positive lead 29. The diodes 24 and 25 are disposed in opposition to each other and biased by means of two batteries 30 and 31, respectively. Thus, the diode 24 is biased to a predetermined negative voltage level and once a positive signal from the amplifier 22 exceeds this negative voltage level the positive signal will be bypassed directly through the diode 24 to ground lead 26. In a like manner, the diode 25 is biased to a predetermined positive voltage level and thus once a negative signal from the amplifier 22 exceeds this positive voltage level it will be bypassed directly to the ground lead 26. The ground lead 26 in turn is connected by means of conductors 27 and 28 to the ground circuit 21 contained in the logging cable 12.

When the above-described receiver 14 receives an acoustical impulse which has been generated by the transmitter 13 and transmitted through the formation surrounding the borehole to the reeciver it will convert it into a fluctuating electrical signal similar to that shown in FIGURE 2a. From an inspection of FIGURE 2a it will be noted that the first arriving signals 70a have a relatively low amplitude while the later arriving signals 71a have a much larger amplitude. These later arriving signals may be due to the shear wave in limestone formations or the direct transmission of the sound impulse from the transmitter 13 through the borehole fluid to the receiver 14. The amplifier 22 will amplify the signals shown in FIGURE 2a and provide a signal having a wave shape similar to that shown in FIGURE 2b. From an inspection of these wave forms it is easily seen that the initially arriving signals now exceed the noise level of the system and can easily be detected above the background noise level. While the first arriving signals now exceed the noise level the later arriving signals such as 71b have an extremely high amplitude. These signals would completely obliterate or mask out the signal from the second receiver unless appropriate steps are taken to either switch off the first receiver or modify the form of the signal. The modification of the signal form is performed by the clipping circuit described above and the output signal from this circuit is shown in FIGURE 2c. From an inspection of this signal it can be seen that the portion of the signal shown in FIGURE 2b which exceeds the biasing level of the diodes 24 and 25 is clipped or removed and thus the signal is maintained at a low constant amplitude. Even though the signal is maintained at a constant amplitude it should be noted that wave form of the initial portion remains substantially unaltered and only the later arriving portions are clipped.

The signal from the second receiver 15 resulting from the receiving of an acoustical impulse is passed through an amplifier 34 having a predetermined amplification factor, preferably exceeding that of amplifier 22 by a factor of ten or more. The signal from the amplifier 34 is coupled to a slicing circuit which consists of parallel branches containing diodes 35 and 36 and batteries 41 and 40, respectively. The slicing circuit is disposed in the positive lead 37 from the amplifier with a load resistor 43 being connected between the positive lead and a ground lead 42. The diodes 35 and 36 are disposed in opposition with diode 35 being biased to a predetermined negative voltage level while the diode 36 is biased to a predetermined positive level. Thus, a negative signal from the amplifier 34 must exceed the biasing level of the diode 35 before it can pass through the diode 35 and be transmitted to the mixing circuit. In a like manner, a positive signal from the amplifier 34 must exceed the positive biasing level of the diode 36 before it can pass through this diode and be transmitted on to the mixing circuit. The negative and positive biasing levels of the diodes 35 and 36 should be set so that they equal or slightly exceed the normal noise level of the signal from the amplifier 34. The slicing circuit removes this center portion or noise level from the signal transmitted by the amplifier 34 and supplies a noise free signal to the mixing circuit. As seen in FIGURE 2d the signal from the second receiver 15 has a lower initial amplitude than the signal from the first receiver 14. This low level signal is amplified by the amplifier 34 which has a larger gain than amplifier 22 preferably exceeding the gain of amplifier 22 by at least a factor of ten. The amplified signal as shown in FIGURE 2e is then supplied to the slicing circuit which removes the center or noise containing portion of the signal. The sliced signal which is shown in FIGURE 2f is then supplied to the mixing circuit described below which transmits it along with the clipped signal from receiver 14 to the surface over the conductor 56 in logging cable 12.

The signal from the first receiver after it is passed through the clipping circuit is supplied by means of conductor 32 to one-half of the mixing circuit while the signal from the receiver 15 after it is passed through the slicing circuit is supplied to the other half of the mixing circuit by a conductor 44. The mixing circuit consists of two triodes 45 and 46 whose plates are coupled together by means of a lead 35. The cathodes of both triodes are coupled directly to ground while the grids are biased by means of grid resistors 50 and 52 and batteries 51 and 53, respectively. The plates are supplied with power through a plate resistor 54 which is coupled to the positive conductor 20 by means of a lead 58. From the above description it can be appreciated that the two triodes 45 and 46 form normal triode amplifiers and that a signal supplied to one tube will be supplied directly to the conductor 56 contained in the logging cable 12 and similarly a signal supplied to the other triode will also be supplied to the conductor 56. The conductor 56 forms a single circuit between the downhole or subsurface apparatus and the surface recording equipment and, accordingly, both signals are transmitted over the single circuit. The combined signals from the mixing circuit will have a wave shape similar to that shown in FIGURE 2g. In this figure, the initial portion of the signal 76 is that portion of the signal resulting from the receiver 14 as illustrated in FIGURE 2c, while the later portion 77 is a combination of the signal from receiver 14 and from receiver 15 and shows the addition of the sliced signal from the receiver 15 to the clipped signal from the receiver 14. In other words the signals shown in FIGURES 2c and 2f are algebraically added and transmitted by the mixing circuit to the surface recording equipment over the single circuit means 56.

At the surface the combined signal from the circuit means 56 is passed through a high gain amplifier 60 and a low gain amplifier 61. The signals from the amplifiers 60 and 61 are supplied to an oscilloscope control network 62 which in turn controls the two beams of a dual beam oscilloscope 63 so that one trace 64 illustrates the signal from the low gain amplifier 61 while the second trace 65 illustrates the signal from the high gain amplifier 60. From an inspection of the two traces 64 and 65 it can be seen that the signal from the receiver 15 is clearly shown in the trace 64 while the trace from the receiver 14 is barely visible if at all. In trace 65 the signal from the receiver 14 is clearly shown in addition to the signal from the receiver 15. Thus, it is a simple matter to determine exactly when the acoustical impulse was received at the receivers 14 and 15 and the two signals do not intermingle or mask out each other even though they were transmitted over a single circuit means. This result is accomplished without switching off or silencing either receiver. While the signals are slightly modified by the system of this invention the initial wave shape of the signal from receiver 14 is preserved and the wave shape of the signal from receiver 15 is only slightly modified by the slicing circuit. The shape of the initial portion of the wave of each signal is of course important since the shape of the initial portion of the signals often times gives valuable information regarding formations surrounding the borehole.

While the above description relates to a single preferred embodiment this invention should not limited to the details described since additional circuits may be devised for performing various functions in the system. Accordingly, this invention should only be limited to its broad spirit and scope.

I claim as my invention:

1. An acoustical well logging system comprising:
a subsurface apparatus having a pair of spaced receivers, a sound source positioned on one side of said receivers for producing acoustical impulses which travel past said receivers in succession;
each of said receivers converting the received impulse into a related electrical signal, the receiver located nearest to said transmitter being coupled to a first amplifier having a fixed gain and limiting circuit to reduce the signal to a maximum uniform amplitude, the other receiver being coupled to a second amplifier having a fixed gain which exceeds the gain of said first amplifier;
said first and second amplifiers being coupled to a circuit means for combining the signals from said amplifiers and transmitting them to the surface over an electrical circuit;
said electrical circuit being coupled to surface equipment including a high gain amplifier and a low gain amplifier, the signal transmitted to the surface being supplied to both of said surface amplifiers, the outputs of said surface amplifiers being recorded by separate recording means.

2. An acoustical well logging system comprising: a subsurface apparatus having a pair of spaced receivers, a sound source positioned on one side of said receivers for producing acoustical impulses which travel past said receivers in succession; each of said receivers having a background noise level and in addition being capable of converting the received impulse into a related electrical signal; one of said receivers being coupled to a first amplifier having a fixed gain; a limiting circuit, said first amplifier being coupled to said limiting circuit to reduce the signal to a uniform maximum amplitude; the other receiver being coupled to a second amplifier having a fixed gain which exceeds the gain of said first amplifier; a slicing circuit, said second amplifier being coupled to said slicing circuit to remove the noise level of the signal; a circuit means coupled to said limiting circuit and said slicing circuit for combining the signals from said spaced receivers and transmitting them to the surface over a single electrical circuit.

3. An acoustical well logging system comprising: a subsurface apparatus having a pair of spaced receivers; a sound source positioned on one side of said receivers for producing acoustical impulses which travel past said receivers in succession; each of said receivers having a background noise level and in addition being capable of converting the received impulse into a related electrical signal; the receiver located nearest to said transmitter being coupled to a first amplifier having a fixed gain; a limiting circuit, said first amplifier being coupled to said limiting circuit to reduce the signal to a uniform maximum amplitude; the other receiver being coupled to a second amplifier having a fixed gain which exceeds the gain of said first amplifier; a slicing circuit, said second amplifier being coupled to said slicing circuit to remove the noise level of the signal; said limiting circuit and said slicing circuit being coupled to a circuit means for combining the signals from said limiting and said slicing circuits and transmitting them to the surface over a single electrical circuit; said single electrical circuit being coupled to surface equipment including a high gain amplifier and a low gain amplifier, the signal transmitted to the surface being supplied to both of said surface amplifiers, the outputs of said surface amplifiers being recorded by separate recording means.

4. A system for seismic measurement comprising: a surface recording apparatus; a subsurface apparatus adapted to be lowered into a borehole, said subsurface apparatus including an acoustical wave source and two receivers spaced along a vertical line, said receivers having a background noise level and being mounted to one side of said wave source, a single circuit means connecting both of said receivers to the surface recording apparatus, means coupled to said wave source for energizing said wave source to produce an acoustical impulse reaching said two receivers in succession, each receiver translating said impulse into an electrical signal to be transmitted to said recording apparatus; the receiver nearest to said wave source being coupled to a first amplifier to amplify and limit the signal of said receiver to a uniform maximum amplitude; the other receiver being coupled to a second amplifier to amplify the signal of said other receiver to a larger amplitude than the electrical signal of the near receiver and then modify the amplified signal to remove the portion of the signal that does not exceed the noise level of the signal of the other receiver, both said first and second amplifiers being coupled to a single electrical circuit to transmit the signals of said first and second amplifiers to receording apparatus over said single electrical circuit.

5. A system for maintaining the separation between a pair of signals transmitted in succession over a single circuit means, at least one of said signals having a background noise level, said system comprising: a single circuit means; first amplifying means capable of amplifying a signal to a constant maximum amplitude, one of said signals being supplied to said first amplifying means; a second amplifying means capable of amplifying a signal to an amplitude that exceeds the constant amplitude of the first amplifying means, the other of said signals being supplied to said second amplifying means; a signal modifying means, said second amplifying means being coupled to said signal modifying means to remove the background noise level of said other signal; a combining circuit, said first amplifying means and said signal modifying means being coupled to said combining circuit and said combining circuit being coupled to said single circuit means.

6. A system for transmitting a pair of signals in succession from a downhole well logging instrument to a surface recording station at least one of said signals having a background noise level, said system comprising: a first circuit means for limiting one of the signals to a constant maximum amplitude; a second circuit means for amplifying the other signal to an amplitude that exceeds the amplitude of the one signal by a factor of at least ten and then modifying the amplified other signal to remove that portion that does not exceed the noise level of the other signal; a third circuit coupled to said first and second circuits for combining signals for transmission over a single circuit to a surface recording station.

References Cited by the Examiner

UNITED STATES PATENTS

| | | | |
|---|---|---|---|
| 2,265,768 | 12/41 | Athy et al. | 181—.5 |
| 2,520,297 | 8/50 | Anderson | 181—.5 |
| 2,708,485 | 5/55 | Vogel | 181—.5 |
| 2,767,388 | 10/56 | Rust | 181—.5 |
| 2,794,965 | 6/57 | Yost | 340—15 |
| 2,897,476 | 7/59 | Widess | 340—15 |
| 2,946,643 | 7/60 | Hutchison et al. | 181—.5 |
| 2,966,953 | 1/61 | Heintz | 181—.5 |

SAMUEL FEINBERG, *Primary Examiner.*

CARL W. ROBINSON, CHESTER L. JUSTUS,
*Examiners.*